United States Patent [19]

Rohm

[11] Patent Number: 5,580,197
[45] Date of Patent: Dec. 3, 1996

[54] PNEUMATICALLY SELF-CLEARING CHUCK

[76] Inventor: Günter H. Rühm, Heinrich-Röhm-Strasse 50, 89567 Sontheim, Germany

[21] Appl. No.: 411,520

[22] Filed: Mar. 28, 1995

[30] Foreign Application Priority Data

Apr. 2, 1994 [DE] Germany ............... 44 115 24.5

[51] Int. Cl.[6] ............................................. B23B 31/12
[52] U.S. Cl. ........................ 408/240; 279/61; 408/56
[58] Field of Search ............................ 279/61, 157, 902; 408/56, 67, 124, 240; 173/75, 76, 77, 78, 79

[56] References Cited

U.S. PATENT DOCUMENTS

| | | |
|---|---|---|
| 4,607,855 | 8/1986 | Rohm . |
| 4,627,628 | 12/1986 | Rohm . |
| 4,669,932 | 6/1987 | Hartley ........................... 279/902 X |
| 4,836,563 | 6/1989 | Rohm ............................. 279/902 X |
| 4,968,191 | 11/1990 | Palm ................................. 279/61 X |
| 5,129,467 | 7/1992 | Watanabe et al. ................ 408/67 X |
| 5,172,923 | 12/1992 | Nakamura ....................... 279/157 X |
| 5,286,041 | 2/1994 | Rohm . |

*Primary Examiner*—M. Rachuba
*Assistant Examiner*—Henry Tsai
*Attorney, Agent, or Firm*—Herbert Dubno; Andrew Wilford

[57] ABSTRACT

The chuck is used with a drill drive unit having a spindle extending along and rotatable about an axis. The chuck has a chuck body fixed on the spindle and formed with an axially forwardly open tool recess on the axis, a plurality of angularly spaced and angled guide holes opening into the recess and having inner surfaces, and a respective grit-clearing passage opening at a respective front end into each of the guide holes axially rear-ward of the recess. Respective jaws displaceable in the guide holes have outer surfaces riding on the inner surfaces of the respective guide holes and have front ends in the recess. An adjustment sleeve is rotatable about the axis on the body and interengaging formations on the sleeve and on the jaws displace the jaws radially on rotation of the sleeve about the axis.

25 Claims, 7 Drawing Sheets

PNEUMATICALLY SELF-CLEARING CHUCK

FIELD OF THE INVENTION

The present invention relates to a drill chuck. More particularly this invention concerns a pneumatically self-clearing power-drill chuck.

BACKGROUND OF THE INVENTION

A standard drill has a drive unit having a front end and an output shaft projecting from the front end and centered on and rotatable about an axis. A chuck body fixed on the shaft is formed with a rear end juxtaposed with the drive-unit front end, an axially forwardly open tool recess on the axis, and a plurality of angularly spaced and angled guides opening into the recess. Respective jaws displaceable in the guides have front ends in the recess. An adjustment sleeve rotatable about the axis on the body engages via formations such as screwthreads with the jaws for displacing the jaws radially on rotation of the sleeve about the axis. The shaft can also axially reciprocate or be provided with a reciprocating core shaft for hammer-drill action.

It is known, for example from commonly owned U.S. Pat. Nos. 4,607,855 and 4,627,628, to form the guides as outwardly opening holes so that any chips, oil drops, or the like that accumulate in the chuck can be thrown radially off, reducing fouling of the chuck mechanism. Nonetheless fine particles can build up and form a mechanism-clogging crust in the chuck. As a result the parts become unable to move freely relative to each other for self-tightening action or the like as described in commonly owned U.S. Pat. No. 5,286, 041. The clamping force of the chuck is therefore reduced.

Hence commonly owned U.S. patent application 08/411, 522 filed 28 Mar. 1995 describes a drill having a drive unit in turn having a front end and an output shaft projecting from the front end and centered on and rotatable about an axis, and a fan associated with the shaft for creating a moving stream of air traversing a location at the drive-unit front end. A chuck body fixed on the shaft is formed with a rear end juxtaposed with the drive-unit front end, an axially forwardly open tool recess on the axis, a plurality of angularly spaced and angled guides opening into the recess, and at least one passage extending between the chuck rear end and the recess. Respective jaws displaceable in the guides have front ends in the recess. An adjustment sleeve is rotatable about the axis on the body and interengaging formations on the sleeve and on the jaws displace the jaws radially on rotation of the sleeve about the axis. A deflector at the location directs the air stream into the passage for conducting the air stream through the recess so that any chips or the like in the recess will be entrained therefrom by the air stream.

Thus with this system the air stream keeps the interior of the chuck clear, either by blowing out or aspirating chips and grit, depending on the direction of the air stream. In fact the system can create a high-pressure zone inside the chuck so that chips and the like cannot settle therein but are effectively prevented from entering at all.

While these systems have some effectiveness in keeping the tool recess clear, they do not prevent dust and grit from getting into the guide passages for the jaws. Thus these passages can become crusty to the extent where rotation of the jaws about their axes becomes difficult or impossible. Such rotation is exploited in self-tightening drill systems. Thus the known systems could use some improvement.

OBJECTS OF THE INVENTION

It is therefore an object of the present invention to provide an improved pneumatically self-clearing drill chuck.

Another object is the provision of such an improved pneumatically self-clearing drill chuck which overcomes the above-given disadvantages, that is which even keeps the jaw guide passages clean.

SUMMARY OF THE INVENTION

The chuck according to this invention is used with a drill drive unit having a spindle extending along and rotatable about an axis. The chuck has a chuck body fixed on the spindle and formed with an axially forwardly open tool recess on the axis, a plurality of angularly spaced and angled guide holes opening into the recess and having inner surfaces, and a respective grit-clearing passage opening at a respective front end into each of the guide holes axially rearward of the recess. Respective jaws displaceable in the guide holes have outer surfaces riding on the inner surfaces of the respective guide holes and have front ends in the recess. An adjustment sleeve is rotatable about the axis on the body and interengaging formations on the sleeve and on the jaws displace the jaws radially on rotation of the sleeve about the axis.

Thus with this system any grit or particles that get into the guide holes will be able to work their way out of the chuck. Such foreign matter will not deposit between the jaws and the bores, but instead will work its way into the grit-clearing passage and thence out of the device.

According to the invention the passages open at the respective front ends radially outward into the guide holes. More particularly the formations include a row of teeth formed on each jaw and projecting radially outwardly from the axis relative to the respective jaw so that the front ends of the passage are diametrally opposite the respective jaw teeth. The formations include a screwthread on the ring axially forward of the passage front ends. In addition each of the jaws is formed with at least one longitudinally extending groove opening into the recess and communicating with the respective passage front end. The grooves are open radially outward and the passage ends open radially inward and each jaw is further formed parallel to the first-mentioned groove with a second longitudinally extending groove opening into the recess and with a third circumferential groove interconnecting the respective first and second grooves. In an alternate arrangement these grooves could be formed in the inner surfaces of the guide holes. These grooves ensure excellent scavenging of any particles in the jaw guide holes. Each jaw is movable relative to the chuck body through a predetermined longitudinal stroke and each groove has a length equal at least to the length of the stroke.

The chuck body according to the invention has a rear face turned axially toward the drive unit and each passage has a rear end opening at the rear chuck face. The rear ends of the passages all lie on a circle centered on the axis. Such a chuck can be provided with a rearwardly open deflector cup mounted on the chuck body and having an open front end into which the rear ends of the passages open. In this arrangement the drive unit has blower means including a fan immediately rearward of the chuck-body rear face for creating a stream of air through the passages, when the stream moves axially forward it blows chips and the like forward out of the chuck, and when rotating oppositely it aspirates them. The fan has radially projecting vanes fixed relative to the chuck body. In another arrangement the blower means can have an output tube that aligns with the concentric rear ends of the passages as the chuck turns to blow into them or suck out of them.

In another similar arrangement the drill spindle is formed with an end aperture in the chuck body and the drive unit is provided with blower forming a stream of air traversing the aperture. The chuck body has a rearwardly open spindle hole into which the spindle fits. The passages each have a rear end opening into the spindle hole. It is also possible for the passages to have outer ends radially outward of the front ends and opening radially outward on the chuck body. The passages extend secantally between the respective ends. Relative to a normal rotation direction of the chuck body about the axis, each passage outer end trails the respective front end. Thus centrifugal force creates a self-pumping action in the angled passages.

The chuck body and sleeve according to another feature of the invention together form an annular space into which the outer ends of the passages open and the sleeve is formed with radially throughgoing holes level with the space. The chuck body is formed inside the sleeve with a radially outwardly open groove forming the space, although it is possible for the sleeve to be formed instead with the groove. Each guide hole has a rear end opening into the space.

The chuck body can in accordance with this invention be formed at its front end around the tool recess with an axially forwardly projecting collar of an inside diameter greater than an inside diameter of the tool recess and formed with radially throughgoing holes. Such a chuck can have a rearwardly flared shield attached to the collar and defining with the chuck body a radially outwardly open space into which the holes of the collar open.

In another arrangement the chuck body is formed with at least one additional grit-clearing passage having an inner end opening into the tool recess and an outer end opening on an outer surface of the chuck body. It is also possible for the chuck body and sleeve to together form an annular space into which the guide bores open. In this case the chuck body and sleeve are formed with radially throughgoing passages opening into the space, externally of the chuck body, and into the tool recess.

According to another feature of the invention the chuck body and sleeve together form an annular space into which the guide bores open and the chuck body is formed with at least one further axially extending passage extending between a rear face of the chuck body and the space. When the chuck is provided with mechanism engaged between the sleeve and the chuck body for self-tightening the chuck, the further passage passes through the mechanism.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 7:
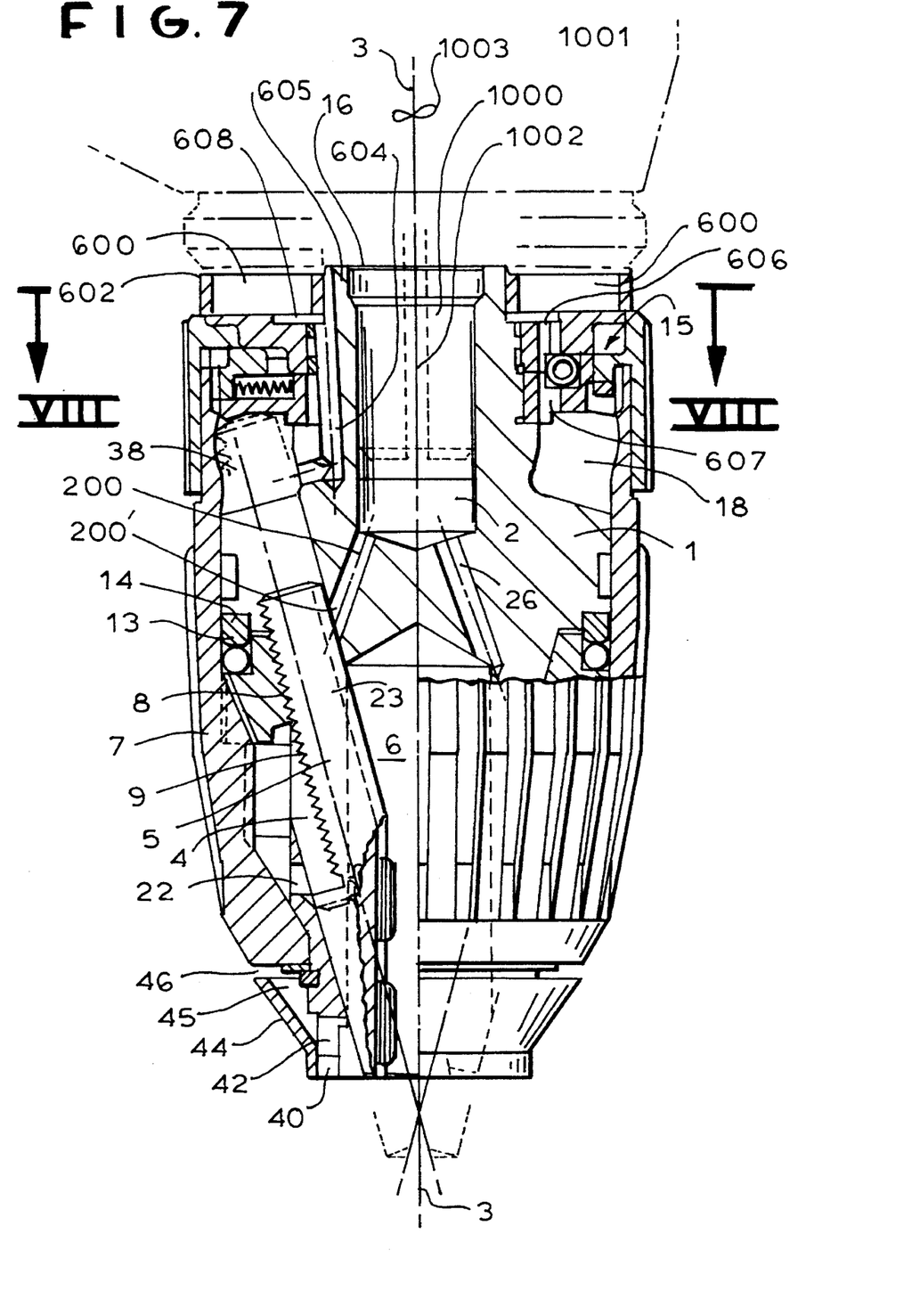

As seen in FIGS. 1 through 5 a chuck has a body 1 formed centered on an axis 3 with a rearwardly open hole 2 into which the front end of a spindle shown at 1000 in FIG. 7 fits and a front end formed with a recess or hole 6 adapted to receive the shank of an unillustrated drill bit or the like. Three circular-section angled guide passages or holes 4 are angularly equispaced about the axis 3 and open into the recess 6. Each hole 4 slidably receives a respective jaw 5 which is of circular section with an outer chordal flat formed with teeth 9 that mesh with a frustoconical screwthread 8 of an inner part 7.1 of an adjustment sleeve 7 rotatable about the axis 3 and axially fixed on the chuck body 1. The difference in cross section between the jaws 5 and holes 4 creates in each hole 4 a space extending the full length thereof. At its front end an outer part 7.2 of the sleeve 7, which is rotationally fixed to the threaded inner ring part 7.1, bears via a shield washer 11 on a snap ring 10 set in the chuck body 1 and at its back end the outer part 7.2 bears via a roller bearing 12 on an abutment ring 13 sitting on a shoulder 14 of the body 1.

Figure 1:
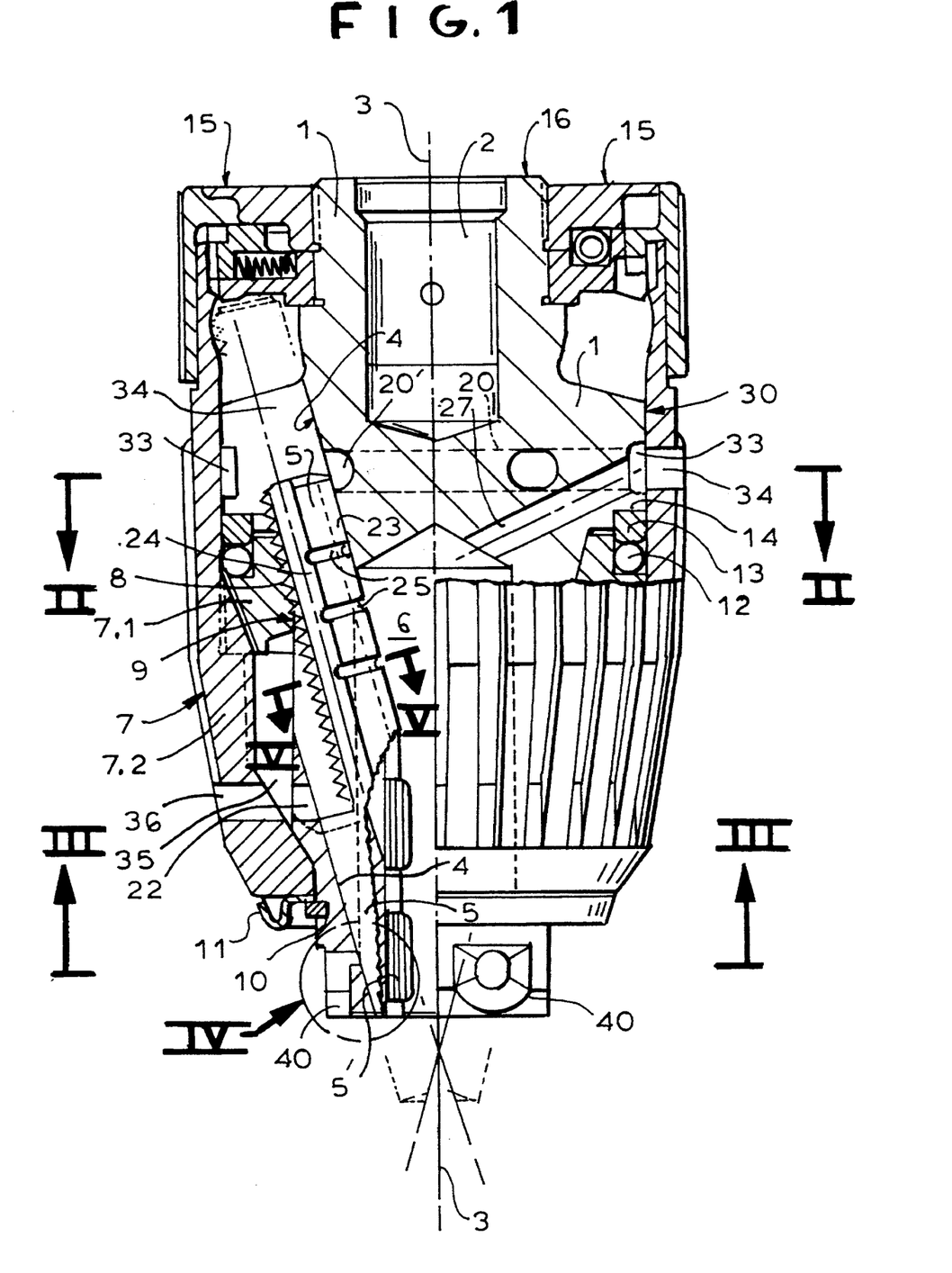
FIG. 1 is a side view partly in axial section through the chuck according to the invention.
Figure 2:
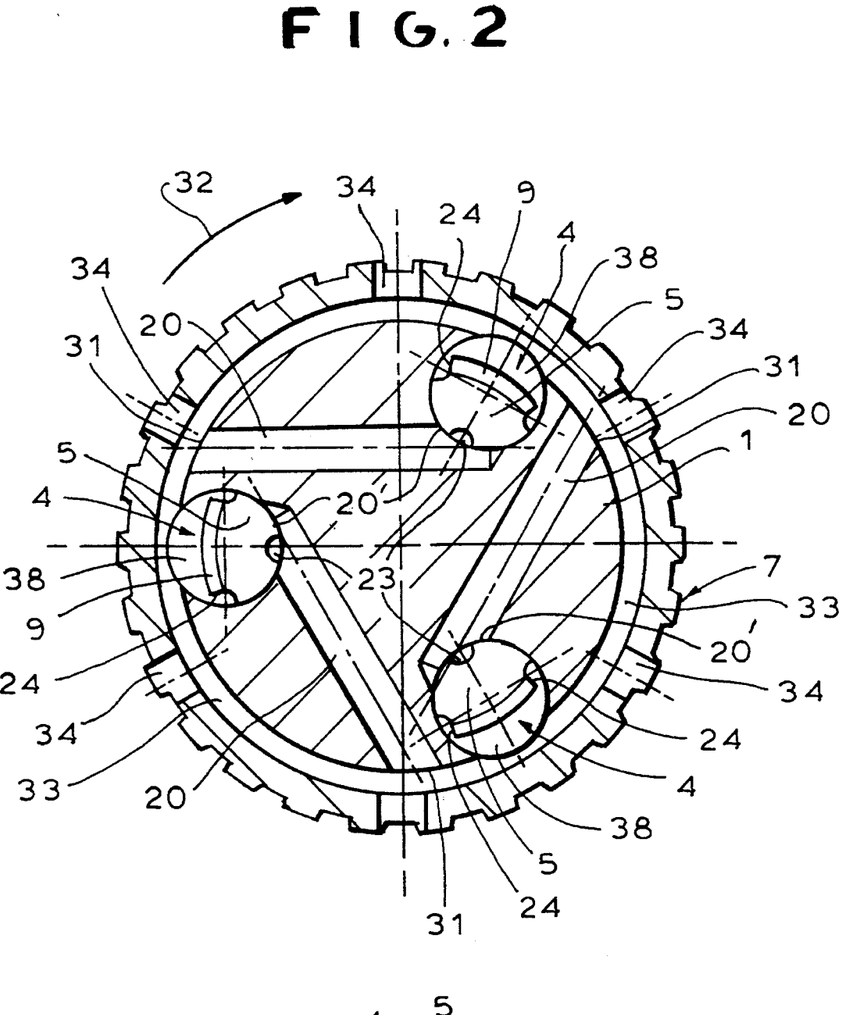
FIGS. 2 and 3 are sections taken along respective lines II—II and III—III of FIG. 1.
Figure 3:
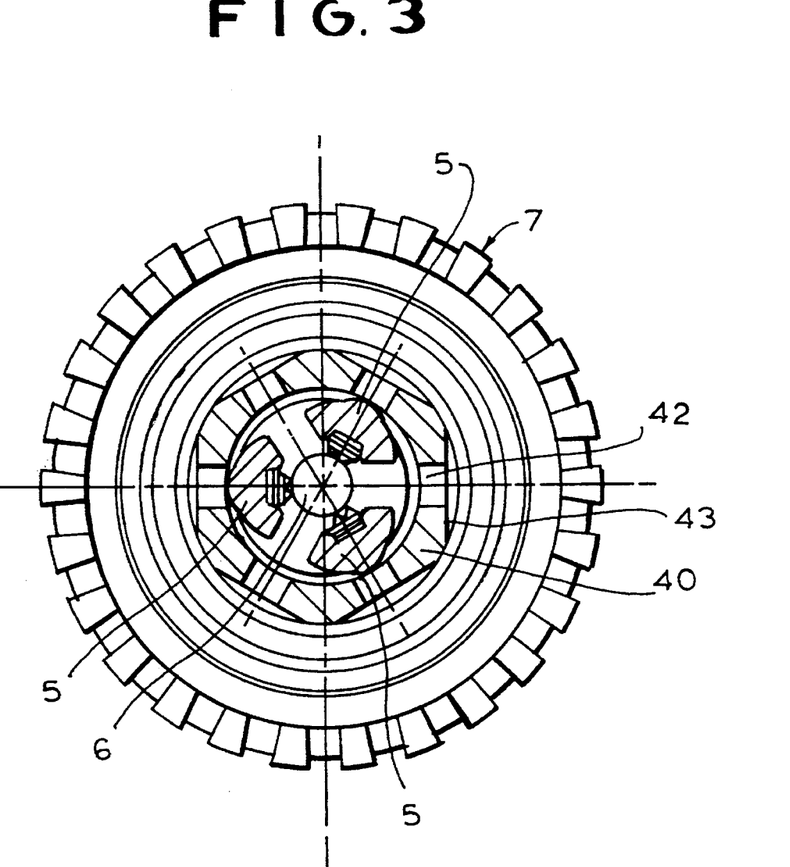

Rotation of the sleeve 7 about the axis 3 in a forward direction advances the jaws 5 axially forward and radially inward to grip a tool in the recess 6 between outer ends of the jaws 5 and opposite rotation of the sleeve 7 moves then axially back and radially out. A locking and self-tightening system 15 of the type described in U.S. patent application Ser. No. 08/225,525 filed 6 Apr. 1994 (U.S. Pat. No. 5,435578 issued 25 Jul. 1995) is provided on the chuck 2. Thus when carbide teeth 5' on the jaws 5 bite into the unillustrated tool, the chuck will self-tighten. In addition an axially extending hole may extend through the body 1 from the floor of the spindle hole 2 to the top of the tool recess 6 so that a hammer rod in the drill spindle can act directly on the rear end of a tool chucked in the recess 6.

According to the invention the chuck body 1 is formed with a plurality of secantally extending passages 20 lying in a plane perpendicular to the axis 3 and each having an inner end 20' opening radially inward into a respective one of the jaw holes 4 axially rearward of the screwthread 8 and an outer end 31 opening into a radially outwardly open groove 33 formed in a cylindrical outer surface 30 of the chuck body 1 and open to the exterior via radially throughgoing holes 34 formed in the outer sleeve part 7.2. The groove 33 could also be formed in the inner surface of the sleeve 7. Each outer end 31 of each passage 20 is behind the respective inner end 20' in a normal forward rotation direction 32 of the chuck so that natural forward rotation will centrifugally create an in-to-out suction effect in the passages 20. In addition the chuck body 1 and sleeve part 7.2 form a space 18 (FIG. 7) into which the rear ends of the guide holes 4, the groove 33, and the passage ends 20' open. The groove 33 also communicates with empty spaces 38 in each guide hole 4 that extend along the outer side of each jaw 5 where it is formed with the teeth 9. At least one further passage 27 has an inner and front end opening into the rear end of the tool recess 6 and a rear and outer end opening into the base of the groove 33

Figure 5:
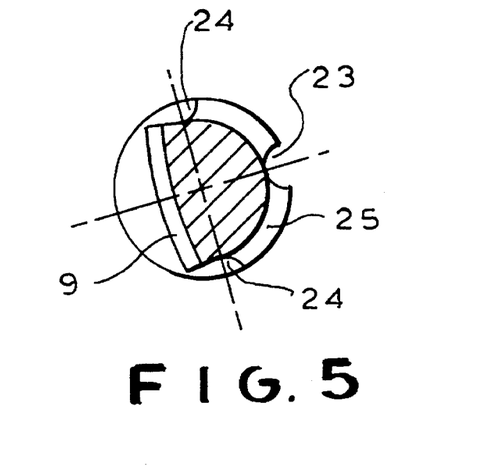
FIG. 5 is a section taken along line V—V of FIG. 1.

The jaws 5 are each formed as also shown in FIG. 5 with longitudinal grooves 23 and 24 and circumferential grooves 25. The groove 23 is diametrally opposite the teeth 9 and is of a length equal to the full axial displacement of the jaw 5 while the grooves 24 flank the teeth 9 and the grooves 25 interconnect the grooves 23 and 24. It would be possible to form the grooves 23, 24, and 25 in the inner surface of the holes 4, but this would be somewhat more complex than machining them into the jaws 5.

Figure 4:
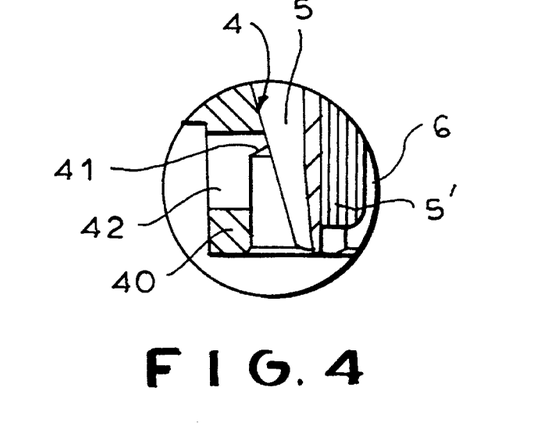
FIG. 4 is a large-scale view of the detail indicated at IV in FIG. 1.

At its front end the chuck body 1 has as best seen in FIG. 4 an axially forwardly projecting collar 40 centered on the axis 3 and having an inside diameter greater than the diameter of the recess 6, with an inwardly projecting annular ridge 41 defining the front end of the recess 6. Radially throughgoing holes 42 in the collar 41 open radially outward so that any particles in this region can escape radially outward as the chuck rotates. The collar 40 is formed with facets or flats 43 so it can be gripped by a tool to screw the chuck body 1 onto a threaded drill spindle.

Furthermore the sleeve part 7.2 and chuck body 1 form forward of the sleeve part 7.1 an annular space 35 into which the guide holes 4 open and which communicates via inner bores 22 with inner regions of the spaces 38 and via outer holes 36 with the exterior. Grit and the like can further escape through these holed 22 and 36 through the space 35.

Figure 6:
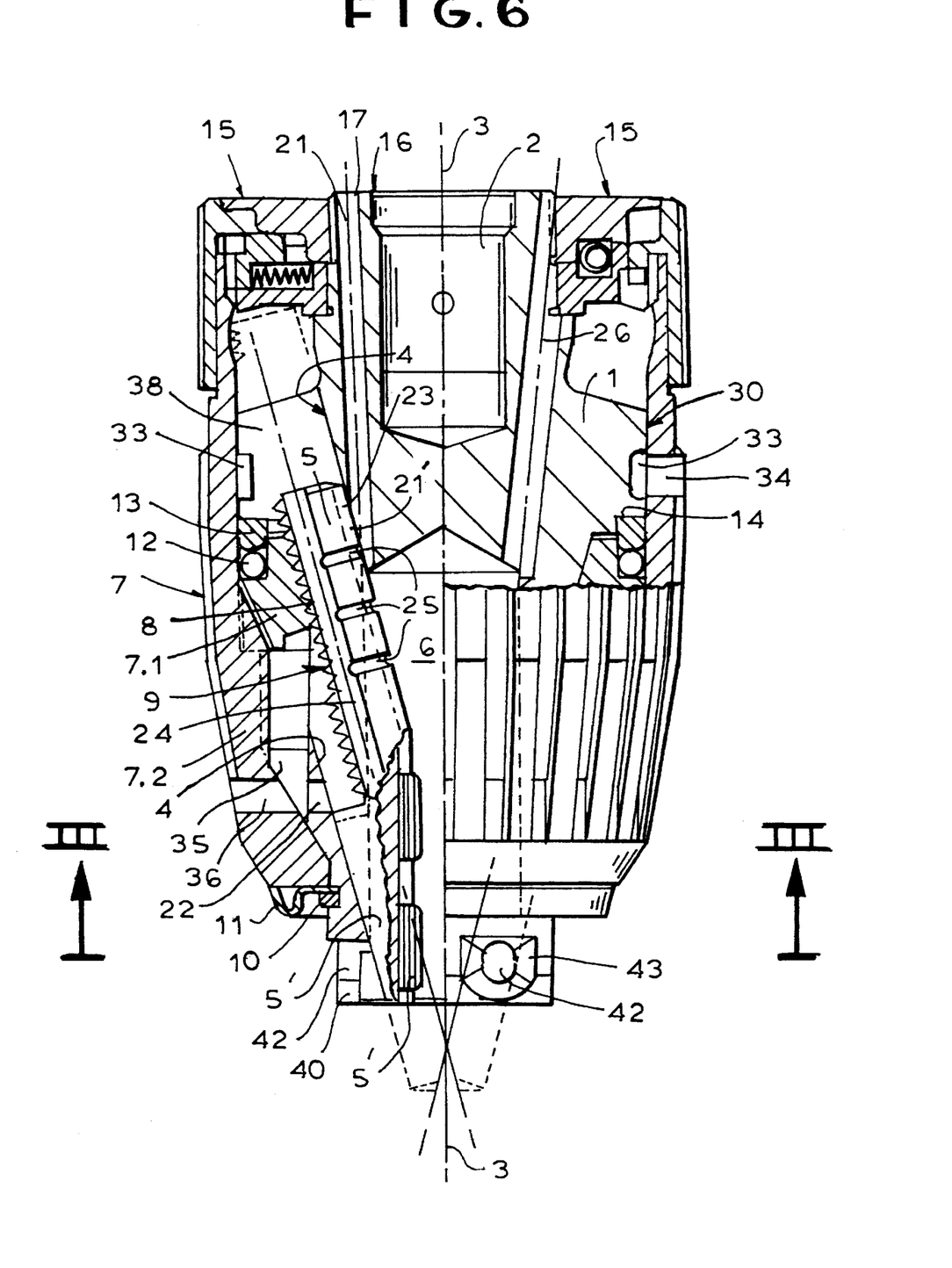
FIGS. 6 and 7 are views like FIG. 1 of further chucks according to the invention.

In FIG. 6 the passages 20 are replaced with mainly axially extending passages 21 that open at rear ends 17 on a rear end face 16 of the chuck body 1 and at their axial front ends 21' in the inner sides of the guide holes 4. Otherwise this embodiment is identical to that of FIGS. 1 through 5.

The arrangement of FIG. 7 has, instead of the passages 20, passages 200 and 26 that extend from the base of the spindle bore 2 to the holes 4 and the recess 6, respectively. Once again the passages 200 each open forward at a location 200' axially slightly rearward of the screwthread 8. In addition here the spindle 1000 is mounted on a drive unit 1001 having an internal fan shown schematically at 1003 and the spindle 1000 is formed with an axially centered bore 1002. This fan or blower means 1003 can expel air from or suck air in via the bore 1002, normally the former, to create a stream of air that will flush particles from the chuck.

In addition in FIG. 7 the body 1 is formed with an L-shaped bore 604 opening at its front end into the space 23 and at its rear end 605 at the rear face 16 of the chuck body 1. Another passage 607 opens at its front end into the space 18 and at its rear end 606 into the base of a groove 608 formed on the back face 16 of the body 1 around a rearwardly projecting axially centered collar 601. The passage or passages 607 traverse the self-tightening mechanism 15 to allow any grit in it to move axially back.

Figure 8:
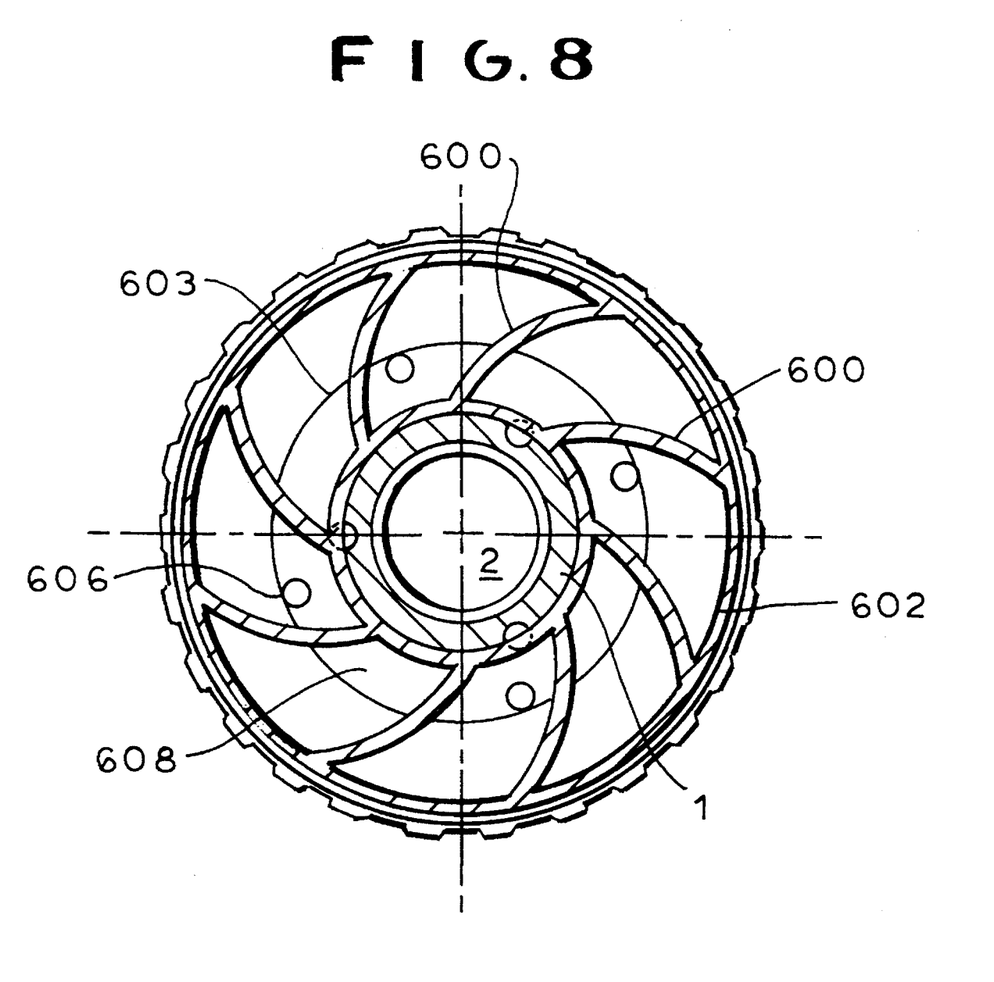
FIG. 8 is a section taken along line VIII—VIII of FIG. 7.

The collar 601 as shown in FIG. 8 carries an inner ring 603 of a fan having vanes 600 extending from this ring 603 to an outer protector ring 602. The vanes 600 are angled so that as the chuck rotates they pull air in and force it down the rear ends 605 and 606 of the passages 604 and 607.

Furthermore as shown in FIG. 7 the collar 40 at the front end of the chuck body 1 is fitted with a rearwardly flared shield ring 44 that defines a triangular-section annular space 45. A gap 46 formed between the rear end of the shield 44 and the sleeve 7 allows chips that are blown and thrown centrifugally from the recess 6 through the holes 42 into the space 45 to be ejected radially from the chuck 2. Alternately if the air stream is acting in the recess as suction, the air drawn in through the gap 46, space 45, and holes 42 will entrain chips in the recess 6 and suck them back through the passages 26 and 200. The shield 44 may be formed with radially extending vanes to enhance the air-flushing effect.

Figure 9:
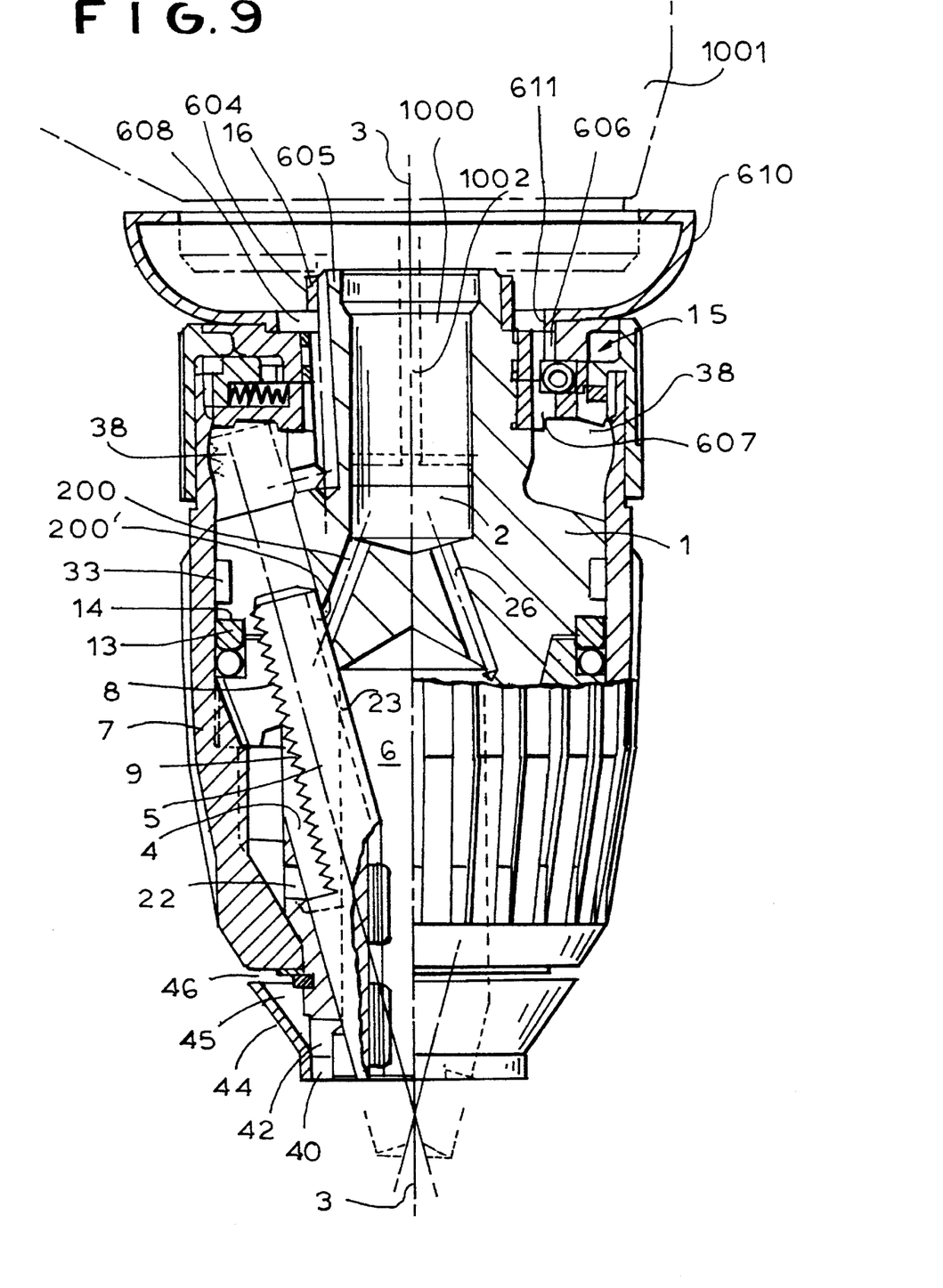
FIG. 9 is a view like FIG. 1 of another chuck according to the invention.

In FIG. 9 a chuck substantially identical to that of FIGS. 7 and 8 is shown, but which is provided with a rear-end air-catching or -funneling cup 610 having an inner lip or periphery 611 that is seated in the groove 608. This cup 610 funnels air from a blower means in the drive unit 100 into the rear ends 605 and 606.

I claim:

1. In combination with a drill drive unit having a spindle extending along and rotatable about an axis, a chuck comprising:
   a chuck body fixed on the spindle and formed with
      an axially forwardly open tool recess on the axis,
      a plurality of angularly spaced and angled guide holes opening into the recess and having inner surfaces, and
      a respective grit-clearing passage opening at a respective front end into each of the guide holes axially rearward of the recess;
   respective jaws displaceable in the guide holes, having outer surfaces riding on the inner surfaces of the respective guide holes, and having front ends in the recess;
   an adjustment sleeve rotatable about the axis on the body; and
   means including interengaging formations on the sleeve and on the jaws for displacing the jaws radially on rotation of the sleeve about the axis.

2. The chuck defined in claim 1 wherein the passages open at the respective front ends radially outward into the guide holes.

3. The chuck defined in claim 2 wherein the formations include a row of teeth formed on each jaw and projecting radially outwardly from the axis relative to the respective jaw, whereby the front ends of the passage are diametrally opposite the respective jaw teeth.

4. The chuck defined in claim 3 wherein the formations include a screwthread on the sleeve axially forward of the passage front ends.

5. In combination with a drill drive unit having a spindle extending along and rotatable about an axis, a chuck comprising:
   a chuck body fixed on the spindle and formed with
      an axially forwardly open tool recess on the axis,
      a plurality of angularly spaced and angled guide holes opening into the recess and having inner surfaces, and
      a respective grit-clearing passage opening at a respective front end into each of the guide holes axially rearward of the recess;
   respective jaws displaceable in the guide holes, having outer surfaces riding on the inner surfaces of the respective guide holes, and having front ends in the recess, each of the jaws being formed with at least one longitudinally extending groove opening into the recess and communicating with the respective passage front end;
   an adjustment sleeve rotatable about the axis on the body; and
   means including interengaging formations on the sleeve and on the jaws for displacing the jaws radially on rotation of the sleeve about the axis.

6. The chuck defined in claim 5 wherein each of the grooves is open radially outward and the passage ends open radially inward.

7. The chuck defined in claim 6 wherein each jaw is further formed parallel to its first-mentioned groove with a second longitudinally extending groove opening into the recess and with a third circumferential groove interconnecting the respective first and second grooves.

8. The chuck defined in claim 5 wherein each jaw is movable relative to the chuck body through a predetermined longitudinal stroke and each groove has a length equal at least to the length of the stroke.

9. The chuck defined in claim 1 wherein the body has a rear face turned axially toward the drive unit and each passage has a rear end opening at the rear chuck face.

10. The chuck defined in claim 9 wherein the rear ends of the passages all lie on a circle centered on the axis.

11. The chuck defined in claim 9, further comprising
a rearwardly open deflector cup mounted on the chuck body and having an open front end into which the rear ends of the passages open.

12. The chuck defined in claim 9, further comprising
blower means including a fan mounted on the drive unit immediately rearward of the chuck-body rear face for creating a stream of air through the passages.

13. The chuck defined in claim 12 wherein the fan has radially projecting vanes fixed relative to the chuck body.

14. The chuck defined in claim 1 wherein the drill spindle is formed with an end aperture in the chuck body and the drive unit is provided with blower forming a stream of air traversing the aperture, the chuck body having a rearwardly open spindle hole into which the spindle fits, the passages each having a rear end opening into the spindle hole.

15. The chuck defined in claim 1 wherein the passages have outer ends radially outward of the front ends and opening radially outward on the chuck body, the passages extending secantally between the respective ends.

16. The chuck defined in claim 15 wherein, relative to a normal rotation direction of the chuck body about the axis, each passage outer end trails the respective front end.

17. The chuck defined in claim 15 wherein the chuck body and sleeve together form an annular space into which the outer ends of the passages open and the sleeve is formed with radially throughgoing holes level with the space.

18. The chuck defined in claim 17 wherein the chuck body is formed inside the sleeve with a radially outwardly open groove forming the space.

19. The chuck defined in claim 17 wherein each guide hole has a rear end opening into the space.

20. The chuck defined in claim 1 wherein the chuck body is formed at its front end around the tool recess with an axially forwardly projecting collar of an inside diameter greater than an inside diameter of the tool recess and formed with radially throughgoing holes.

21. The chuck defined in claim 20 wherein the chuck further comprises
a rearwardly flared shield attached to the collar and defining with the chuck body a radially outwardly open space into which the holes of the collar open.

22. The chuck defined in claim 1 wherein the chuck body is further formed with
at least one additional grit-clearing passage having an inner end opening into the tool recess and an outer end opening on an outer surface of the chuck body.

23. The chuck defined in claim 1 wherein the chuck body and sleeve together form an annular space into which the guide bores open and the chuck body and sleeve are formed with radially throughgoing passages opening into the space, externally of the chuck body, and into the tool recess.

24. The chuck defined in claim 1 wherein the chuck body and sleeve together form an annular space into which the guide bores open and the chuck body is formed with at least one further axially extending passage extending between a rear face of the chuck body and the space.

25. The chuck defined in claim 24 wherein the chuck is further provided with
a mechanism engaged between the sleeve and the chuck body for self-tightening the chuck, the further passage passing through the mechanism.

* * * * *